(No Model.)

N. B. MARSTON.
FLOOR SET.

No. 529,929. Patented Nov. 27, 1894.

Witnesses:
Jas H Blackwood
Albert B Blackwood

Inventor.
Nathaniel B. Marston.
per
B. W. Cager.
Attorney.

THE NORRIS PETERS CO., PHOTO-LITHO., WASHINGTON, D. C.

UNITED STATES PATENT OFFICE.

NATHANIEL B. MARSTON, OF LEBANON, NEW HAMPSHIRE.

FLOOR-SET.

SPECIFICATION forming part of Letters Patent No. 529,929, dated November 27, 1894.

Application filed April 12, 1894. Serial No. 507,249. (No model.)

*To all whom it may concern:*

Be it known that I, NATHANIEL B. MARSTON, a citizen of the United States, residing at Lebanon, in the county of Grafton and State of New Hampshire, have invented certain new and useful Improvements in Floor-Sets; and I do hereby declare the following to be a full, clear, and exact description of the invention, such as will enable others skilled in the art to which it appertains to make and use the same.

My invention relates to a class of devices known as floor-sets, and is designed to be an improvement on Letters Patent No 460,790, granted to me October 6, 1891; and its object is to provide a simple, effective and compact device whereby flooring boards or other joiner's work may be quickly and firmly pressed and held in place until permanently secured.

The nature of my invention will be described below and pointed out in the claim.

Figure 1:
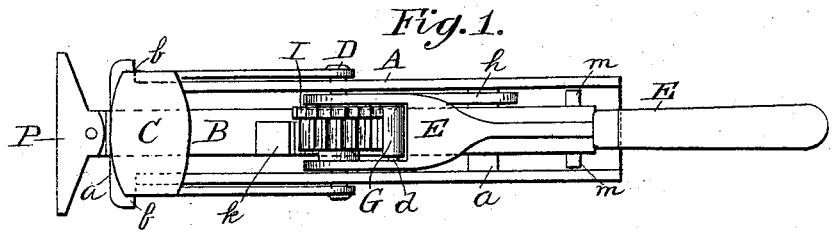
Figure 2:
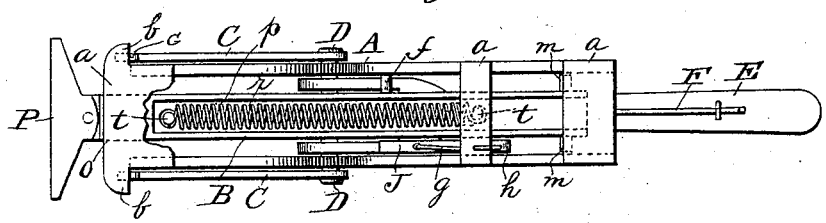
Figure 3:
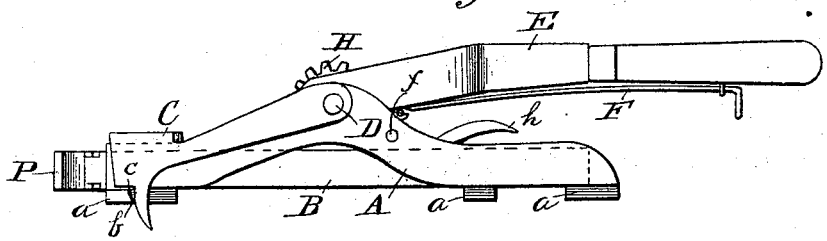
Figure 4:
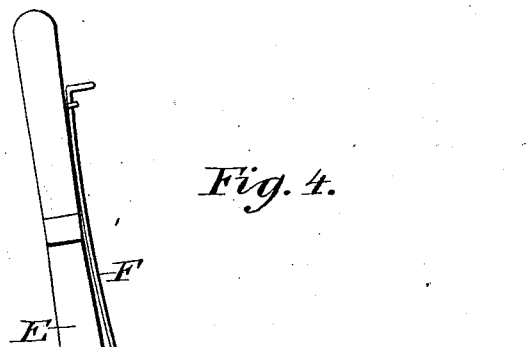

In the drawings—Figures 1 and 2 are plan views, looking at the top and bottom. Fig. 3, is a side view. Fig. 4, is a side view, partly in vertical section.

Like letters refer to like parts.

A is the frame, which may be made of metal. At the center it is raised or arched, and on the under side there are three cross-pieces $a$. $a$ forming, with the sides of the frame, a guide for the sliding bar B. The end of the forward cross-piece extends beyond the sides of the frame and forms shoulders $b.b$, behind which the integral, double spur C falls, the latter having shoulders $c.c$, and being loosely attached outside of the raised portion of the frame to fulcrum-pin D. Upon said pin, and within the frame, is fulcrumed the forked lever E having an operating rod F connecting with a loose pawl or dog G held between the lever-fork by a pin $d$. The dog can be raised or lowered at will by said rod, and engages with a toothed wheel H gearing with bar B. At one side of wheel H is a ratchet-wheel I, both of said wheels being attached to fulcrum-pin D and between the forks of the lever. Passing through the frame is a pin $f$, to which is attached a pawl J, held to ratchet I by a spring $g$ fastened to said pawl and extending down to one of the under cross-pieces $a$. The pawl also has an extension $h$, so that it can be released by the foot when pressed thereon. Pin $f$ is cut away at $i$ so as not to interfere with dog G and wheel H. To engage with the latter, sliding bar B has a portion of its upper side serrated, or made in the form of a rack-bar $k$. The rear end of the bar B has lateral lugs $m$ bearing against the inside of frame A, guiding and steadying said bar. The forward end passes through a snug opening $o$ at the front of the frame, and has loosely pivoted thereto a head P of ample lateral extension, and adapted to adjust itself evenly to the edge of the board.

The bar B, except a small portion forward, is made hollow, see $p$, Figs. 2 and 4, and in this is laid a coiled spring $r$, attached to pins $t$, and the purpose of the spring is to automatically retract bar B when ratchet-wheel I is released from the pawl. By this arrangement of the spring it is out of the way of injury and does not add to the width of the device, and the spring action is direct and strong.

The operation of the device is briefly as follows: Press the spur into the joist. Then each time the lever is drawn toward the operator bar B is pushed out, the ratchet and pawl preventing any back slip. When desirable to release the pressure, press down on the pawl with the foot and the spring will retract the sliding bar, which will also carry forward the lever if it happens to be next to the operator at the close of the operation. The loose pawl G is easily applied to or released from wheel H by rod F, and in the forward throw this pawl slides over the teeth of said wheel without operating the rod and is ready to engage as the back throw begins.

Having described my invention, what I claim, and desire to secure by Letters Patent, is—

The combination with the frame raised at the center, as shown, of the transverse pin passing through said elevated portion, a double spur attached to the outer ends of said pin and falling on both sides of the frame, a forked lever fulcrumed on said pin within the frame and having between its forks a loose pawl operated by a rod, a toothed wheel and a circular ratchet both mounted on said pin within said lever-forks, a spring pawl engaging with said ratchet, and the hollow, sliding bar having a pivoted head at the outer end, a serrated portion on its upper surface gearing with the toothed wheel, and a retracting spring in the hollow portion, as set forth.

In testimony whereof I affix my signature in presence of two witnesses.

NATHANIEL B. MARSTON.

Witnesses:
F. H. FOSTER,
M. F. TARBELL.